Jan. 17, 1967         KOKI HIRANO         3,298,610
CLEANING APPARATUS FOR THE FRONT WINDSHIELD GLASS OF MOTOR CARS
Filed Jan. 25, 1965         3 Sheets-Sheet 1
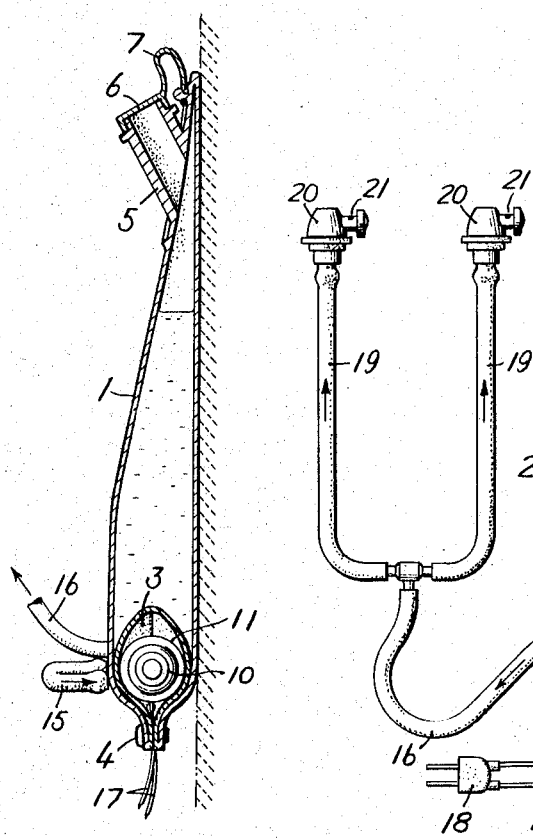
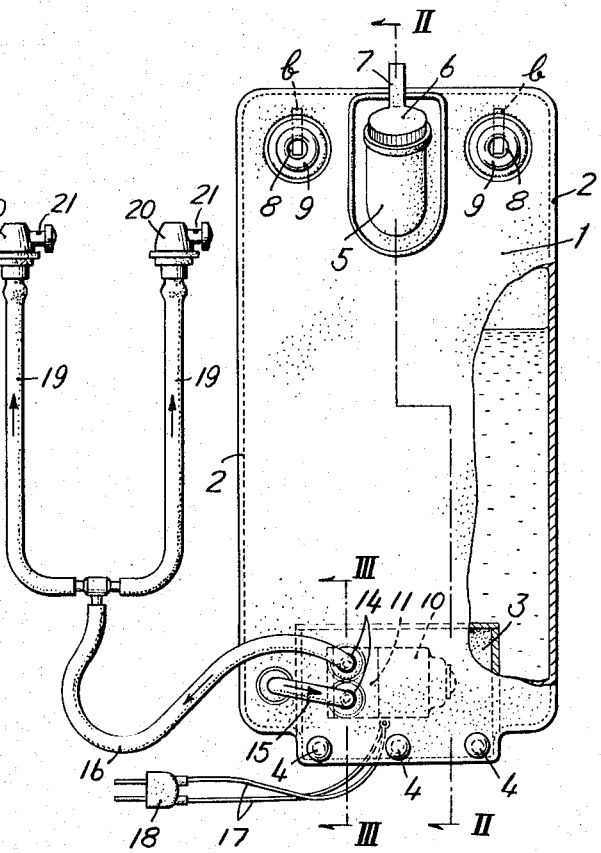
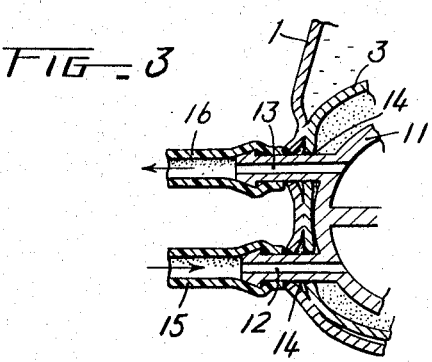
INVENTOR
Koki Hirano
BY Linton and Linton
ATTORNEYS

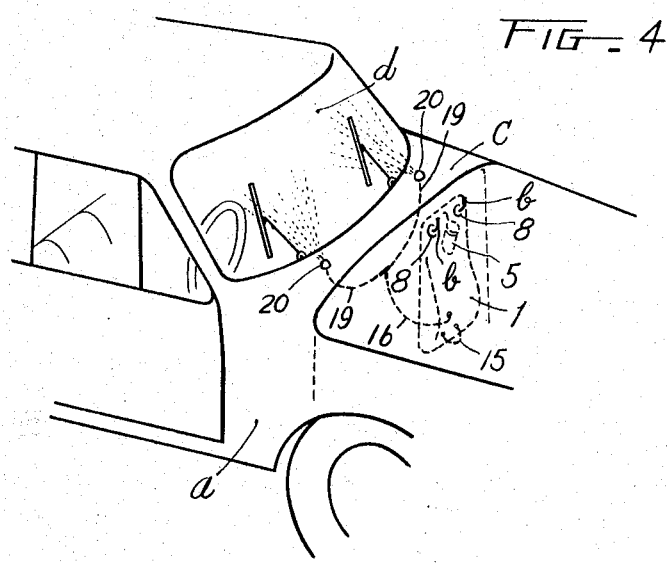
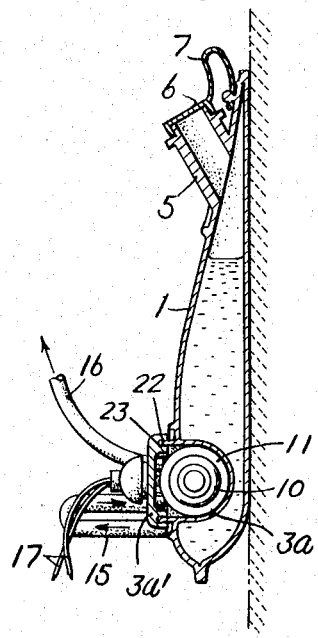
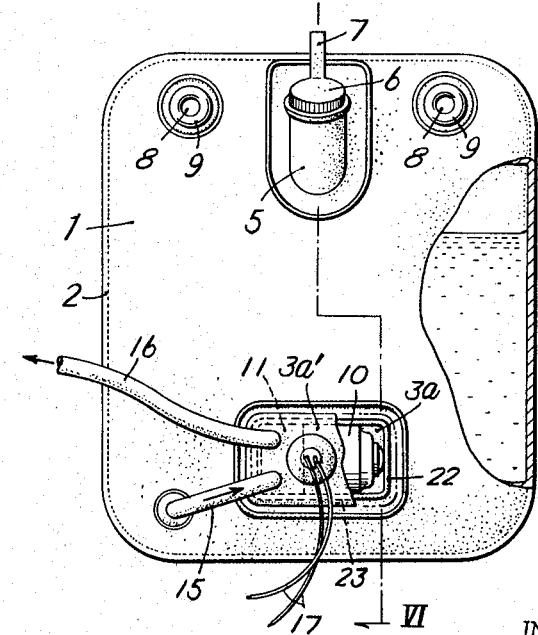

Jan. 17, 1967 KOKI HIRANO 3,298,610
CLEANING APPARATUS FOR THE FRONT WINDSHIELD GLASS OF MOTOR CARS
Filed Jan. 25, 1965  3 Sheets-Sheet 3
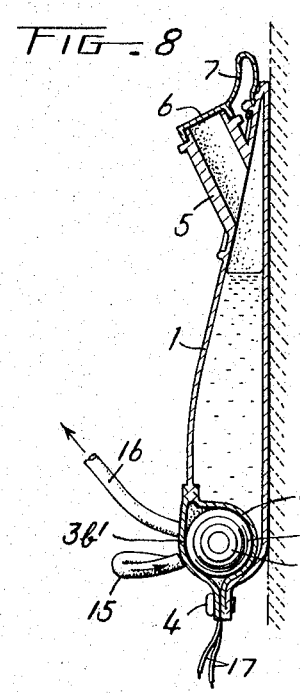
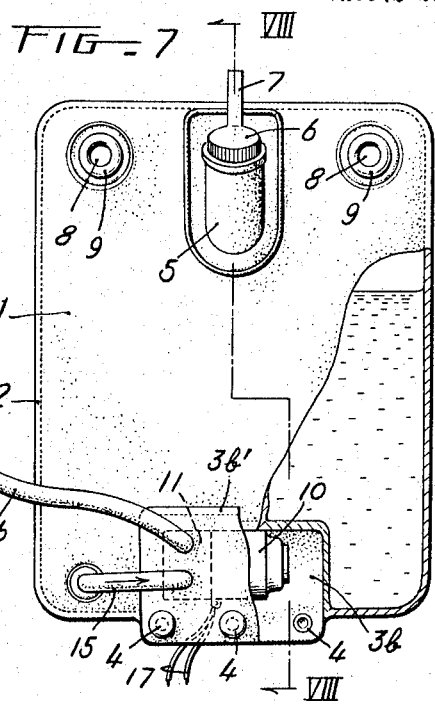
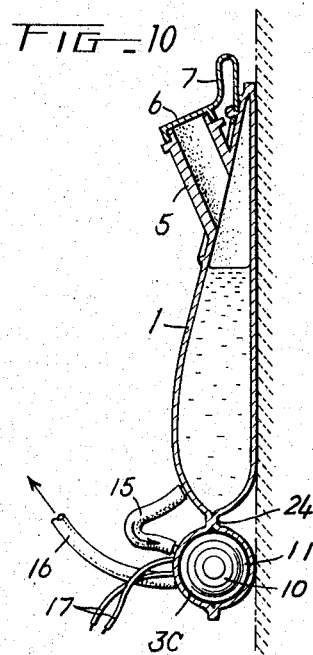
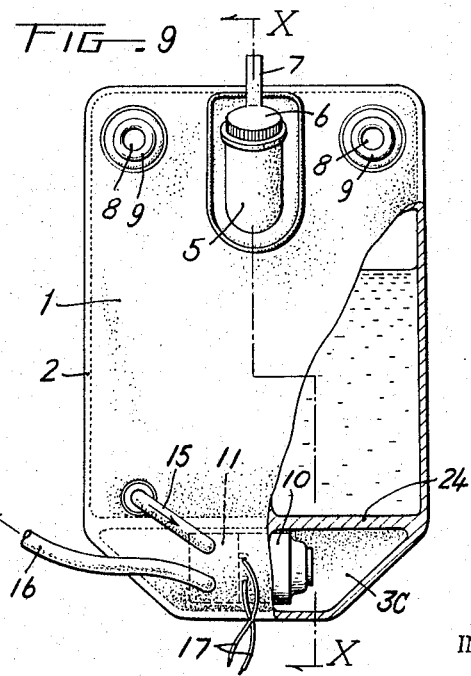
INVENTOR
Koki Hirano
BY Linton and Linton
ATTORNEYS

United States Patent Office 3,298,610
Patented Jan. 17, 1967

---

3,298,610
CLEANING APPARATUS FOR THE FRONT WINDSHIELD GLASS OF MOTOR CARS

Koki Hirano, Fujisawa, Japan, assignor to Jidosha Denki Kogyo Kabushiki Kaishi, Yokohama, Japan, a corporation of Japan
Filed Jan. 25, 1965, Ser. No. 427,630
Claims priority, application Japan, Feb. 6, 1964, 39/7,761
7 Claims. (Cl. 239—284)

The present invention relates to an apparatus for projecting cleansing liquid against the outer surface of the front window windshield glass of a motor car for cleaning the same.

According to the present invention, there is provided such a cleaning apparatus having a cleansing liquid outside bag and a pump chamber disposed therein which are integrally formed out of a pliable plastic sheet or film such as of rubber, synthetic resin or the like, and a pump is directly driven by a small electric motor and is encased in the pump chamber, and the pump is in communication through a suction intake pipe with the cleansing liquid outside bag and is in communication through a supply pipe with a projection nozzle to be attached in front of the front windshield glass of a motor car.

Several forms of the present invention will be explained with reference to the accompanying drawings, in which:

FIG. 1 is a front view, partly in section, of the present invention;

FIG. 2 is a sectional view taken along the line II—II of FIG. 1;

FIG. 3 is a sectional view taken along the line III—III of FIG. 1;

FIG. 4 is a diagrammatical perspective view of the apparatus mounted on a motor car;

FIG. 5 is a front view, partly in section, of a modified embodiment of the present invention;

FIG. 6 is a sectional view taken along the line VI—VI of FIG. 5;

FIG. 7 is a front view, partly in section, of another modified form of the present invention;

FIG. 8 is a sectional view taken along the line VIII—VIII in FIG. 7;

FIG. 9 is a front view, partly in section, of still another modification of the present invention; and FIG. 10 is a sectional view, taken along the line X—X in FIG. 9.

Referring to the drawings, a cleansing outside liquid bag 1 is formed by a pair of pliable synthetic resin plastic sheets which are put one upon another and joined one with another at their circumferential edge portions 2 by an adhesive agent or by heat sealing.

In the first form of embodiment shown in FIGS. 1 to 4, the outside bag 1 is open along its bottom edge at the middle portion thereof, and a square pocket bag 3 made of pliable plastic synthetic resin sheet is inserted through the bottom edge into the outside bag 1 and having an opening edge which is adhered to the outside bag. The pocket bag 3 is provided within the outside bag 1 with its opening edge directed downwards toward the bottom of outside bag 1. The pocket bag 3 can be closed at will at its opening edge by means of a snap fastener 4 or the like.

A liquid suction intake pipe opening 5 which is comparatively larger in thickness than the outside bag 1 projects from the upper portion of the outside bag 1, and a closure 6 applied thereto is connected by a cord 7 to the outside bag 1. At the upper portion of the outside bag 1, there are provided on the right and left a pair of holes 8, 8 having eyelets 9 attached thereto, so that the same become available for hanging up the outside bag 1 on nails b or the like provided at any desired attaching wall portion of a motor car body a.

A pump 11 having intake and output channels and being driven directly by a small electric motor 10 is inserted into the pocket bag 3, which constitutes a pump chamber, and then the pocket bag 3 is closed by the snap fasteners 4. A suction intake pipe 12 (FIG. 3) and a discharging output pipe 13 are arranged to project outside from the pump 11 through respective openings 14, 14 made in the outside bag 1 and the pocket bag 3, and the suction intake pipe 12 is in communication through a connecting pipe 15 with the interior of the cleansing liquid outside bag 1, and the discharge pipe 13 is in communication with a delivery pipe 16. Each opening 14 made in the outer bag 1 and the pocket bag 3 for passing the pipe 12 or 13 therethrough is, as clearly shown in FIG. 3, sealed by heat at its surrounding peripheral portion, so that any leakage of the liquid from such opening 14 can be prevented.

A lead wire 17 from the electric motor 10 is drawn out through the mouth edge of the pocket bag 3, and the same is properly connected to an electric source by inserting its other end plug 18 into a socket. The delivery pipe 16 connected from pump 11 is bifurcated at its front portion, and each branch pipe 19 thereof is provided at its top end with a projection nozzle 20 having a nozzle opening 21 therein. As shown in FIG. 4, each nozzle 20 is fixed to a front cover plate c of the car body a so that the nozzle opening 21 is directed towards the front windshield glass d of the car.

If, in this apparatus, the small electric motor 10 is energized, the pump 11 is so operated that the cleansing liquid in the cleansing liquid outside bag 1 will be sucked up to pass through the liquid supplying pipe 16 for being projected from the nozzle opening 21 towards the front windshield glass d.

The pocket bag 3 in the first form of embodiment shown in FIGS. 1 to 3 can be modified in various manners, for instance, as shown respectively in FIGS. 5 and 6, FIGS. 7 and 8, and FIGS. 9 and 10.

In the first modified embodiment shown in FIGS. 5 and 6, the cleansing outside liquid bag 1 is provided on its lateral front surface lower portion with a form of pocket bag 3a which is open at its lateral front surface and projects inwardly. A covering plate 3a' is applied to the front opening thereof, and the same is removably connected thereto by the engagement between a projecting rim portion 22 projecting outwardly from the circumferential edge of the pocket bag 3a and a corresponding groove 23 made in the circumferential portion of the covering plate 3a'.

In the second modified embodiment of FIGS. 7 and 8, the cleansing outside liquid bag 1 is provided on its front lower portion with a form of pocket bag 3b which is open at its front surface and projects inwardly. The pocket bag 3b is provided at its front opening with a covering film layer 3b', which is integrally connected at its upper edge to the outside bag 1 and is removably connected at its lower edge to the outside bag by means of a snap fastener or the like.

In the modified form of embodiment shown in FIGS. 9 and 10, the cleansing liquid outside bag 1 is divided into upper and lower compartments by a partition 24, and the lower compartment is utilized as a pocket bag 3c.

According to the present invention, the cleansing liquid bag and the pump chamber are integrally formed out of a pliable sheet or film such as of rubber or synthetic resin or the like, and thereby the apparatus may be, as a whole, of a bag shape and can be comparatively small in size and can be disposed at any desired comparatively narrow spaced portion in the car body. Additionally, the pump and the electric motor may always be in contact with the liquid outside bag, so that the pump and motor can be cooled effectively by the liquid in the liquid outside bag.

I claim:

1. In apparatus for cleaning car windshields, a plastic outside bag containing a cleaning liquid, an inside comparatively small compartment within said outside bag, a pump having intake and output channels mounted within said compartment, a motor connected for driving said pump, intake means connected to the intake of said pump for sucking liquid from within said outside bag into the intake channel of said pump, output delivery means connected to the output channel of said pump, and nozzle means mounted adjacent said windshield and oriented for directing a stream of liquid upon said windshield, said output delivery means being connected to said nozzle means.

2. Apparatus according to claim 1, and a partition extending transversely of said outside bag and dividing the same into a comparatively large compartment and said comparatively small compartment, said pump and motor being contained in said comparatively small compartment.

3. Apparatus according to claim 1, and a closed plastic pocket bag contained within said outside bag and attached to the same and constituting said comparatively small compartment.

4. Apparatus according to claim 3, said closed plastic pocket bag having an opening edge directed down to the bottom of said outside bag.

5. Apparatus according to claim 3, said closed plastic pocket bag having an opening on a lateral front surface and plate means mounted on said lateral front surface and adjustable to close the opening in said lateral front surface.

6. Apparatus according to claim 3, said closed plastic pocket bag having an opening in a lateral front surface, and a covering film layer mounted on said lateral front surface and adjustable to close the opening in said front surface.

7. Apparatus according to claim 1, said outside bag being provided on an upper margin with hanging apertures adapted to receive hanging supports.

References Cited by the Examiner

UNITED STATES PATENTS

| | | | |
|---|---|---|---|
| 1,932,615 | 10/1933 | Bumpass | 239—284 |
| 2,766,907 | 10/1956 | Wallace | 239—327 X |
| 3,056,911 | 10/1962 | Hart et al. | 15—250 X |
| 3,158,293 | 11/1964 | Oishei | 15—250 X |
| 3,193,158 | 7/1965 | Lopater | 222—385 X |
| 3,213,493 | 10/1965 | Chichester | 239—284 X |
| 3,237,868 | 3/1966 | Lovell | 239—284 |

M. HENSON WOOD, JR., *Primary Examiner.*

V. C. WILKS, *Assistant Examiner.*